US006413016B1

(12) United States Patent
Nelson et al.

(10) Patent No.: US 6,413,016 B1
(45) Date of Patent: Jul. 2, 2002

(54) METHODS OF EXTRACTING LIQUID HYDROCARDON CONTAMINANTS FROM UNDERGROUND ZONES

(75) Inventors: Stephen Richard Nelson, Edmond; Gregory Robert Feegle, Oklahoma City, both of OK (US)

(73) Assignee: Kerr-McGee Corporation, Oklahoma City, OK (US)

( * ) Notice: Subject to any disclaimer, the term of this patent is extended or adjusted under 35 U.S.C. 154(b) by 0 days.

(21) Appl. No.: 09/640,598

(22) Filed: Aug. 17, 2000

(51) Int. Cl.$^7$ .......................... B09C 1/06; E21B 43/12; E21B 43/24; E21B 43/243
(52) U.S. Cl. .............. 405/128.35; 166/261; 166/272.1; 166/370; 210/747; 210/908; 405/128.4; 588/230; 588/249
(58) Field of Search ................... 166/256, 261, 166/272.1, 369, 370; 210/747, 908; 405/128.15, 128.2, 128.25, 128.3, 128.35, 128.4, 131; 588/228, 230, 249

(56) References Cited

U.S. PATENT DOCUMENTS

| | | | |
|---|---|---|---|
| 3,410,604 A | 11/1968 | White et al. ................ 299/4 |
| 4,084,640 A | 4/1978 | Allred .................... 166/259 |
| 4,263,970 A | 4/1981 | Cha ...................... 166/261 |
| 4,356,866 A | 11/1982 | Savins .................... 166/261 |
| 4,450,910 A | 5/1984 | Hunt, III ................. 166/261 |
| 4,475,592 A | 10/1984 | Pachovsky | |
| 4,832,122 A | * 5/1989 | Corey et al. ......... 166/272.7 X |
| 4,913,065 A | 4/1990 | Hemsath ................ 110/239 |
| 4,957,393 A | 9/1990 | Buelt et al. | |
| 4,982,788 A | * 1/1991 | Donnelly ............... 166/370 X |
| 5,011,329 A | 4/1991 | Nelson et al. | |
| 5,024,556 A | 6/1991 | Timmerman | |
| 5,193,934 A | 3/1993 | Johnson et al. | |
| 5,244,310 A | 9/1993 | Johnson | |
| 5,276,253 A | 1/1994 | Circeo, Jr. et al. ......... 588/253 |
| 5,316,411 A | 5/1994 | Buelt et al. | |
| 5,360,067 A | * 11/1994 | Meo, II ............. 405/128.25 X |
| 5,387,057 A | * 2/1995 | DeLoach ................ 405/128.2 |
| 5,449,251 A | 9/1995 | Daily et al. | |
| 5,482,402 A | * 1/1996 | Nelson ................. 405/131 X |
| 5,494,376 A | 2/1996 | Farrar et al. | |
| 5,564,861 A | 10/1996 | Khudenko | |
| 5,615,974 A | * 4/1997 | Land et al. ........... 405/128.35 |
| 5,765,964 A | * 6/1998 | Calcote et al. ....... 405/128.6 X |
| 5,769,569 A | * 6/1998 | Hosseini ............... 405/128.4 |

FOREIGN PATENT DOCUMENTS

DE 4400180 A1 7/1995

OTHER PUBLICATIONS

Publication entitled Putting The Heat On Contaminants: Three Case Studies Using In Situ Thermal Methods, *Technology/Economics*, vol. 16, Issue 4, pp. 1.2–1.32 (Jul./Aug. 1998).

* cited by examiner

*Primary Examiner*—George Suchfield
(74) *Attorney, Agent, or Firm*—McKee & Taft; C. Clak Dougherty, Jr.

(57) ABSTRACT

Methods of extracting liquid hydrocarbon contaminants from underground zones are provided. The methods are basically comprised of the steps of introducing a hot purge gas into an underground zone containing a pool of liquid hydrocarbon contaminants whereby light liquid hydrocarbons in and around the pool are evaporated and dense liquid hydrocarbons in the pool are evaporated to some extent, charred, auto-ignited and combusted, and removing the hot purge gas, the evaporated light liquid hydrocarbons and combustion gases from the combustion of the dense liquid hydrocarbons in the zone.

14 Claims, 2 Drawing Sheets

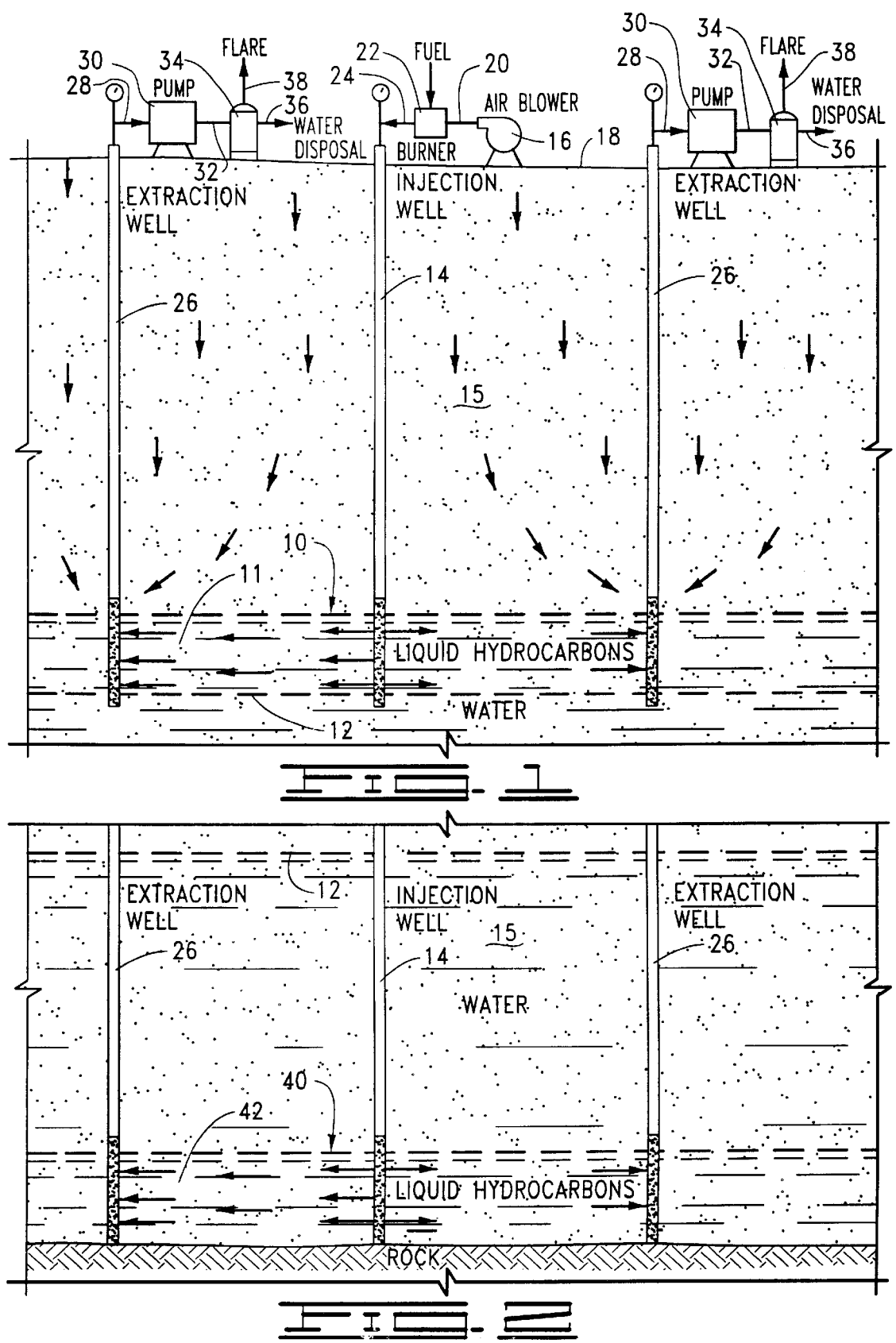

METHODS OF EXTRACTING LIQUID HYDROCARBON CONTAMINANTS FROM UNDERGROUND ZONES

BACKGROUND OF THE INVENTION

1. Field of the Invention

The present invention relates to methods of extracting hydrocarbon contaminants from underground zones, and more particularly, to such methods for extracting pools of liquid hydrocarbons from subterranean zones including those on and below water tables.

2. Description of the Prior Art

Hydrocarbon contaminants which have leaked into the ground from storage tanks, hydrocarbon processing facilities and the like have heretofore been extracted by a variety of methods such as by vaporizing and removing the hydrocarbons, chemically oxidizing the hydrocarbons, biologically degrading the hydrocarbons and the like. While these and other methods have heretofore been successfully utilized in certain hydrocarbon extraction applications, they are not suitable for use in all of such applications.

When the underground hydrocarbon contaminants are light liquid hydrocarbons such as gasoline which can be evaporated by contact with air, methods which evaporate and extract the evaporated hydrocarbons have been used successfully. Such methods are often referred to as soil vapor extraction methods, and they generally include drilling one or more extraction wells into an underground zone which contains light liquid hydrocarbons evenly dispersed throughout unsaturated ground. A vacuum is pulled in the underground zone containing the hydrocarbons which causes air from the surface and surrounding zones to sweep through the porosity of the ground and through the underground zone containing the liquid hydrocarbons whereby the liquid hydrocarbons are evaporated and extracted by way of the extraction wells.

Soil vapor extraction methods have heretofore also included the injection of steam or combustion gases into a contaminated underground zone by way of an injection well to heat the contaminated ground between the injection well and one or more soil vapor extraction wells. While such methods have been successful in removing evenly dispersed light liquid hydrocarbons, they are not effective in removing hydrocarbons that exist in pools on water tables, below water tables or at the bottom of porous ground formations.

Thus, there are needs for improved methods and processes for extracting liquid hydrocarbon contaminants from underground zones including pools of liquid hydrocarbons.

SUMMARY OF THE INVENTION

The present invention provides improved methods of extracting liquid hydrocarbon contaminants from underground zones which meet the above described needs and overcome the deficiencies of the prior art. The methods bring about the removal of evaporatable light liquid hydrocarbons as well as dense liquid hydrocarbons in the form of liquid pools on top of or below water tables or at the bottom of permeable ground formations. The methods of this invention are comprised of the following steps. A hot purge gas is introduced into the underground zone containing liquid hydrocarbon contaminants including a pool of dense liquid hydrocarbons. The hot purge gas heats the underground zone and the liquid hydrocarbon contaminants therein whereby light liquid hydrocarbons in and around the pool are evaporated, and dense liquid hydrocarbons in the pool are evaporated to some extent and the residual is charred, auto-ignited and combusted. The hot purge gas, the evaporated light liquid hydrocarbons and combustion gases from the combustion of the dense liquid hydrocarbons are removed from the underground zone.

The hot purge gas is introduced into the underground zone containing a pool of liquid hydrocarbon contaminants by way of an injection well drilled into the zone. The gases introduced and produced in the zone comprising hot purge gas, the evaporated light liquid hydrocarbons and the combustion gases from the combustion of the dense liquid hydrocarbons are removed from the zone by way of one or more extraction wells drilled into the zone. Vacuums are pulled on the underground zone by way of the extraction wells which bring about the removal of the gases. When the pool of liquid hydrocarbon contaminants is not below ground saturated with water or oil, e.g., the pool of hydrocarbon contaminants is on top of a water table, air is pulled through the porous underground zone containing the pool whereby it vaporizes light liquid hydrocarbons and sweeps the hot purge gas, the vaporized light hydrocarbons and combustion gases out of the underground zone and into the extraction wells. In applications where the pool of liquid hydrocarbon contaminants is below a water table on the bottom of a permeable ground formation, air is included in the hot purge gases for maintaining and controlling the combustion of the dense hydrocarbons.

It is, therefore, a general object of the present invention to provide improved methods of extracting liquid hydrocarbon contaminants from underground zones.

Other and further objects, features and advantages of the invention will be readily apparent to those skilled in the art upon a reading of the description of preferred embodiments which follows when taken in conjunction with the accompanying drawings.

BRIEF DESCRIPTION OF THE DRAWINGS

FIG. 1 is a schematic illustration showing an underground zone containing a pool of liquid hydrocarbon contaminants on top of a water table having an injection well and extraction wells drilled therein and showing the apparatus connected to the wells for carrying out a method of the present invention.

FIG. 2 is a partial schematic illustration similar to FIG. 1 showing a pool of liquid hydrocarbon contaminants in an underground zone beneath the water table on the bottom of a permeable ground formation having the injection and extraction wells drilled therein.

DESCRIPTION OF PREFERRED EMBODIMENTS

Figure 3:
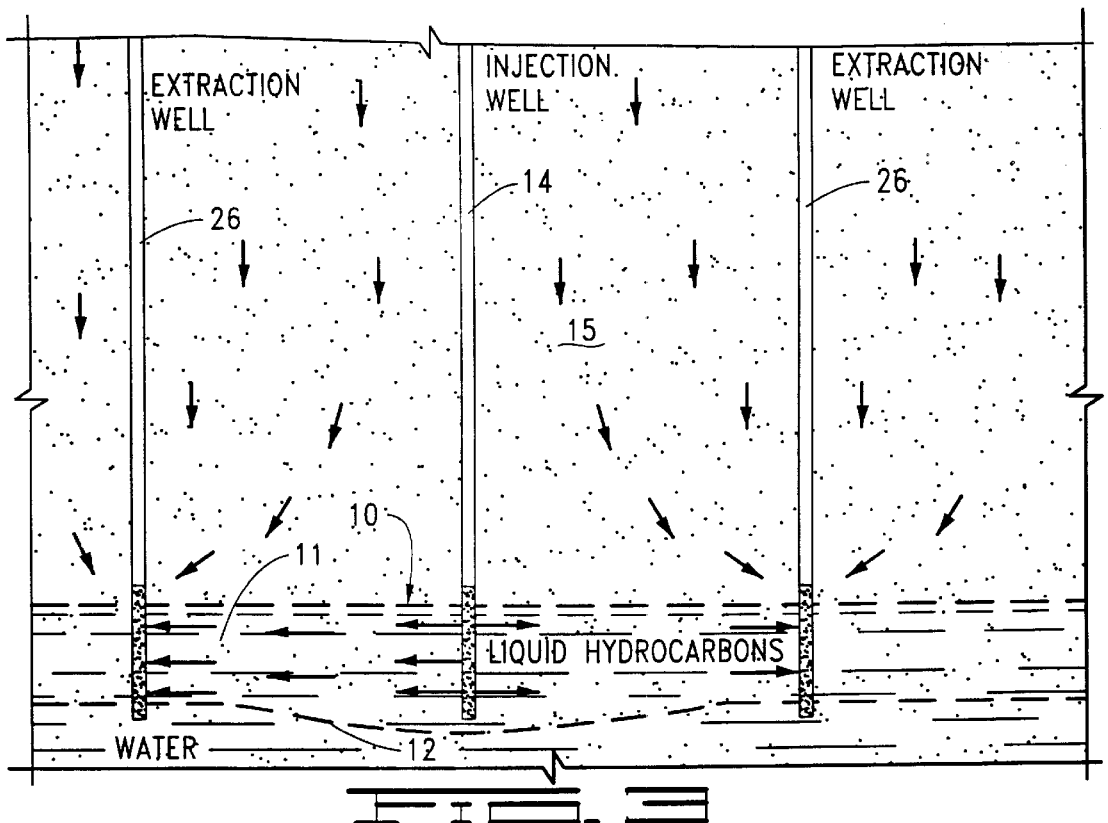
FIG. 3 is a partial schematic illustration similar to FIG. 1 showing the water table after it is pushed down by the pressure of the injected purge gas.

As mentioned, light liquid hydrocarbons such as gasoline, kerosene and diesel oil as well as dense liquid hydrocarbons, creosote and the like have leaked into the ground as a result of spillage or leaks in storage tanks, petroleum processing facilities, loading racks and the like. The liquid hydrocarbons flow through the porosity of the underlying permeable ground formation thereby contaminating the ground. While some of the liquid hydrocarbons remain in the porosity of the ground, a major portion of the liquid hydrocarbons flows through the ground until it is stopped by a water table, an impermeable rock formation or other liquid hydrocarbon impermeable formation that forms the bottom of the porous ground formation. When the liquid hydrocarbon contaminants reach the water table or the bottom of the porous ground formation, a pool of the liquid hydrocarbon contaminants is formed.

In accordance with the present invention, improved methods of extracting hydrocarbon contaminants including pools of liquid hydrocarbons from underground zones are provided which are basically comprised of the following steps. A hot purge gas is introduced into the underground zone containing a pool of liquid hydrocarbon contaminants. The hot purge gas vaporizes light liquid hydrocarbons in and around the zone and causes dense liquid hydrocarbons in the zone to be evaporated to some extent, charred, auto-ignited and combusted. The gases introduced and produced in the underground zone comprising hot purge gas, vaporized light hydrocarbons and combustion gases from the combustion of the dense liquid hydrocarbons are continuously removed from the underground zone until the light liquid hydrocarbons in the zone have been vaporized and removed and the dense liquid hydrocarbons in the zone have been combusted.

The term "light liquid hydrocarbons" is used herein to mean liquid hydrocarbons such as gasoline, kerosene, diesel oil, jet fuel and the like which vaporize at temperatures below about 650° F. The term "dense liquid hydrocarbons" is used herein to mean those liquid hydrocarbons that do not vaporize at temperatures below about 500° F. Such dense liquid hydrocarbons include heavy oil, creosote oil, chlorinated hydrocarbons and the like.

Referring now to FIG. 1, apparatus for carrying out the methods of the present invention is schematically illustrated on the surface 18 of a porous ground formation 15 along with an underground zone 10 containing a pool of liquid hydrocarbon contaminants 11 on top of a water table 12. An injection well 14 is drilled into the underground zone 10 and completed whereby a hot purge gas introduced into the well 14 is discharged into the pool of liquid hydrocarbon contaminants 11 in the zone 10. An air blower 16 is provided on the ground surface 18 which is connected by a conduit 20 to a fuel burner 22. The fuel burner 22 is in turn connected by a conduit 24 to the injection well 14. The burner 22 can be any suitable fuel-air burner for producing hot combustion gases. A particularly suitable and preferred such burner for use in accordance with this invention is a duct or in-line burner for burning air and natural gas and producing hot combustion products. However, as will be understood by those skilled in the art, a variety of other techniques and apparatus can be utilized to produce a hot purge gas such as heating a slip stream with an additional burner or substituting an electric heater, a heat exchanger or furnace in place of the burner 22. In operation of the apparatus connected to the injection well 14 shown in FIG. 1, the air blower 16 provides a stream of air at a pressure of from about 2 psig up to a higher pressure limited by the quantity and type of porous ground above the zone into which the hot purge gas is injected. The air is conducted by the conduit 20 to the burner 22 wherein the air mixes with fuel, preferably one or more hydrocarbons such as methane or natural gas, in the burner 22 and the mixture is burned to form a stream of combustion products having a temperature in the range of from about 350° F. to about 1000° F. The resulting hot purge gas stream flows through the injection well 14 into and through the pool of liquid hydrocarbon contaminants in the underground zone 10.

In order to add additional heat energy (enthalpy) to the combustion products, water can be added to the combustion air whereby the water is evaporated in the burner 22. Generally, water can be added to the air in an amount of about 15% by weight of the air.

At least one, and preferably two or more, extraction wells 26 are drilled into the underground zone 10 containing the liquid hydrocarbon contaminants a distance away from and around the injection well 14. The extraction wells 26 are completed in a manner whereby when a vacuum is pulled on the wells, gases and liquid are drawn into the wells from the underground zone 10. Each of the wells 26 is connected by a conduit 28 to a vacuum pump 30 which creates a vacuum which is pulled on the underground zone 10. Gases, the make-up of which will be described hereinbelow, and water pumped through the vacuum pump 30 are conducted by a conduit 32 to a separator 34 wherein the gases are separated from the water. The separated water is conducted to a point of disposal by a conduit 36 connected to the separator 34, and the separated gases are conducted from the separator 34 by a conduit 38 to a flare or other point of disposal.

In carrying out the methods of the present invention, the injection well 14 and extraction wells 26 drilled into the subterranean zone 10 containing the pool of liquid hydrocarbon contaminants 11 are connected to the surface apparatus described above. Hot purge gas having a temperature in the range of from about 350° F. to about 1000° F. produced by the air blower 16 and burner 22 is caused to flow through the injection well 14 into the underground zone 10. The hot purge gas flows into and around the pool of liquid hydrocarbon contaminants 11 in the zone 10 and heats the pool 11 and zone 10 which causes light liquid hydrocarbons therein to be evaporated and dense liquid hydrocarbons therein to be evaporated to some extent, charred, auto-ignited and combusted. That is, all of the dense liquid hydrocarbons are not evaporated and the residual dense liquid hydrocarbons are heated by the hot purge gas to a temperature in the range of from about 500° F. to about 1000° F. whereby they are charred and auto-ignited. Upon reaching the auto-ignition point, self-sustained combustion is initiated in the dense liquid hydrocarbon char in the absence of a spark or flame. Air pulled through the porous ground formation 15 above and through the underground zone 10 sustains the combustion of the residual dense liquid hydrocarbons.

Simultaneously with the injection of the hot purge gases into the underground zone 10, a vacuum is pulled on the underground zone 10 by way of the extraction wells 26. That is, the vacuum pumps 30 on the ground surface 18 are operated which create a vacuum in the underground zone 10 as well as in the porous ground 15 above the zone 10. The presence of the vacuum causes air to be pulled through the porous ground 15 above the zone 10 and the air and hot purge gas to be swept through the zone 10. As the air and hot purge gas contact light liquid hydrocarbons in the porosity of the ground, they evaporate the light liquid hydrocarbons and carry them into the extraction wells 26. The air and hot purge gas pulled into the underground zone 10 also sustain the combustion of the dense liquid hydrocarbons therein as described above. If additional air is needed, the hot purge gas can include a controlled amount of excess air that can be adjusted to control the combustion of the dense liquid hydrocarbons.

As will be understood by those skilled in the art, the continuous heating of the pool of liquid hydrocarbon contaminants, the underground zone 10 and the surrounding ground by the hot purge gas and by the combustion of the dense hydrocarbons in the zone 10, continuously raises the temperature of the zone 10 and the ground in and above the zone 10 which evaporates the light liquid hydrocarbons in the ground. The resulting mixture comprised of air, purge gas, evaporated light liquid hydrocarbons and combustion gases from the combustion of the dense liquid hydrocarbons is removed from the underground zone 10 by the extraction wells 26. Water and steam are also produced for a period of time until the water table is lowered to a point below the zone 10 and the residual water in the zone 10 is evaporated. The water and steam are either co-produced with the other produced gases through the extraction wells 26 or recovered by way of the extraction wells using a dedicated pump. Alternatively, instead of removing the water by way of the extraction wells 26, a separate water well can be drilled into the water below the water table (not shown) and utilized for lowering and maintaining the water table at a level below the underground zone 10.

If the underground zone 10 containing the pool of liquid hydrocarbon contaminants 11 is at the bottom of a porous ground formation 15 which does not contain water, the same procedure as described above is followed except that water removal or water disposal is not required.

Referring now to FIG. 2, the injection well 14 and extraction wells 26 described above and illustrated in FIG. 1 are shown extending below the water table 12 into an underground zone 40 containing a pool of liquid hydrocarbon contaminants 42 under the water and on the bottom of the porous ground formation 15. The injection well 14 and extraction wells 26 can be extended into the underground zone 40 after the pool of liquid hydrocarbon contaminants 11 in the zone 10 is removed or they can be drilled directly into the zone 40 from the surface 18. The pool of liquid hydrocarbon contaminants 42 in the zone 40 can be made up of dense liquid hydrocarbons that passed through the zone 10 and through a pool of less dense hydrocarbons on the water table 12 and settled to the bottom of the porous ground formation 15 whereby pools of liquid hydrocarbon contaminants formed on both the water table 12 and on the bottom of the porous ground formation 15. Alternatively, the liquid hydrocarbon contaminants can all be dense enough to pass through the water table 12 whereby a single pool of liquid hydrocarbon contaminants 42 formed only on the bottom of the porous ground formation 15. In either event, the pool of liquid hydrocarbon contaminants 42 in the underground zone 40 is removed in accordance with the methods of this invention by drilling the injection well 14 and the extraction wells 26 into the zone 40 as shown in FIG. 2.

The method of the present invention for removing the pool of liquid hydrocarbon contaminants 42 in the underground zone 40 is the same as that described above for the pool of liquid hydrocarbon contaminants 11 in the underground zone 10 except that the vacuum pulled by the extraction wells 26 does not pull air through the porous ground formation 15 into the zone 40. The reason for this is that the porous ground below the water table is saturated with water whereby air can not flow through the ground. Instead of air, water evaporated by the hot purge gas flows into the extraction wells 26 along with purge gas, evaporated light liquid hydrocarbons and combustion gases from the combustion of the dense liquid hydrocarbons in the pool of liquid hydrocarbon contaminants 40. In order to sustain and control the combustion of the dense liquid hydrocarbons, a controlled amount of air is included with the purge gas.

As will be understood by those skilled in the art, the horizontal permeability of porous ground is much greater than the vertical permeability which aids in causing gases injected and formed in the zones 10 and 40 to remain therein and flow to the extraction wells 26.

Figure 4:
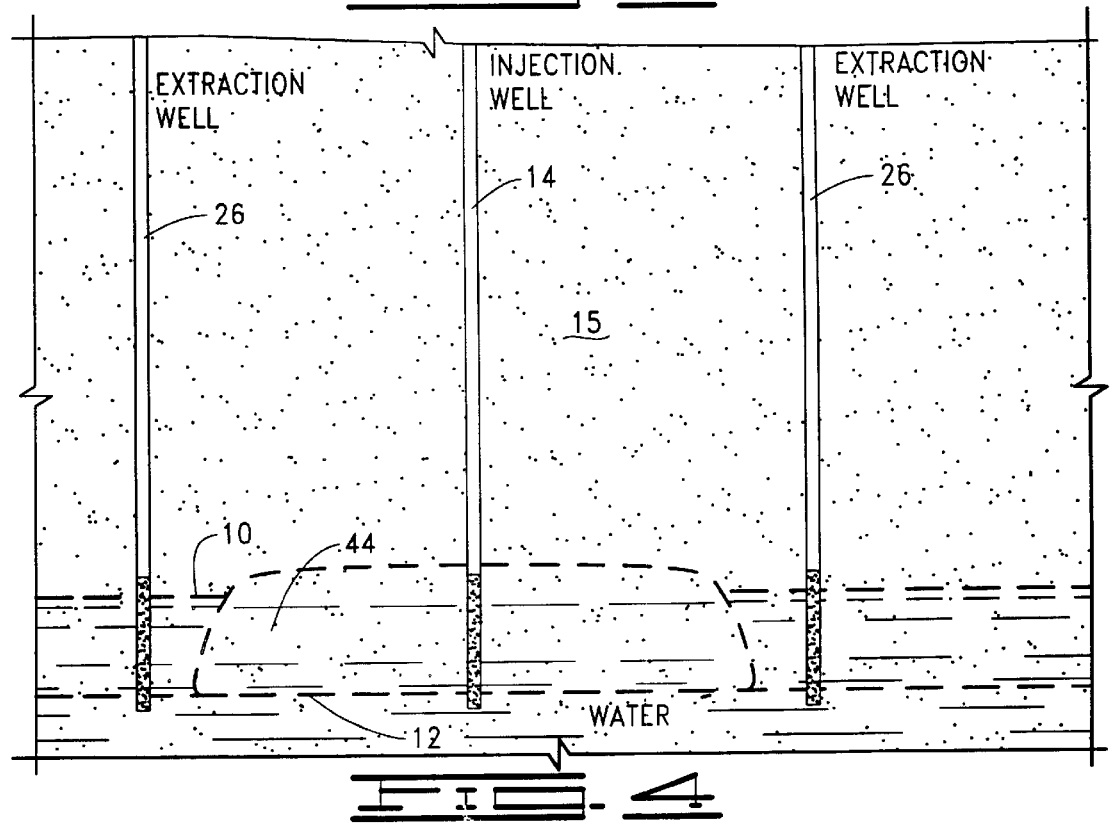
FIG. 4 is a partial schematic illustration similar to FIG. 3 showing the water saturated portion of the underground zone formed as a result of removing the liquid hydrocarbon contaminants therefrom in accordance with this invention.

Also, in applications where a pool of liquid hydrocarbon contaminants is on top of a water table as described above relating to the zone 10, the water table is pushed down by the pressure of the injected purge gas as shown in FIG. 3. The porous ground in the zone 10 is heated to a high temperature as the liquid hydrocarbons therein are evaporated and combusted. As the water table tries to rise, it is evaporated by the hot ground and the steam front generated remains static as the evaporation and combustion of the hydrocarbons continues. When the evaporation and combustion of the hydrocarbons in the zone 10 come to an end, the injection well 14 is shut off but the extraction wells are left in operation. Water that was displaced by the pressure in the injection well during the injection phase flows back into the heated soil in the zone 10. The returning water is held in a hydrokinetic balance by the pressure generated by the vaporization of the water as it enters the hot zone 10. As the soil in the zone 10 is cooled, the water moves up into the zone 10 until it reaches its final hydrostatic equilibrium. The steam that is generated as the water flows into the hot soil in the zone 10 flows into the formation until it reaches soil that is cool enough to condense the steam. This condensation provides additional heat to further vaporize any residual hydrocarbons in the periphery of the zone 10. As additional steam is generated and condensed, a portion of the zone 10 designated by the numeral 44 in FIG. 4 is expanded (condensed water is evaporated and moves out further into zone 10 before condensing again). This continues until the water flowing into the heated soil in zone 10 has reached hydrostatic equilibrium. At that time the water-saturated periphery of the portion 44 of the zone 10 forms an effective barrier to additional vapor flow through the portion 44 of zone 10 in which hydrocarbons have been removed. In addition, the water saturation of the portion 44 retards its recontamination, allowing the injection well 14 and the extraction wells 26 to be moved to an adjacent zone while minimizing recontamination of the portion 44 of the zone 10.

Thus, the methods of the present invention for extracting a pool of liquid hydrocarbon contaminants from an underground zone are basically comprised of the following steps: (a) introducing a hot purge gas into the underground zone containing the pool of liquid hydrocarbon contaminants whereby light liquid hydrocarbons in and around the pool are evaporated and dense liquid hydrocarbons in the pool are evaporated to some extent, charred, auto-ignited and combusted; and (b) removing gases introduced and produced in the underground zone comprised of the hot purge gas, the vaporized light liquid hydrocarbons and combustion gases from the combustion of the dense liquid hydrocarbons in the zone.

A method of the present invention for extracting a pool of liquid hydrocarbon contaminants from an underground zone in a porous ground formation at the bottom of the formation or adjacent to and above a water table therein is comprised of the steps of: (a) drilling an injection well into the underground zone and into the pool of liquid hydrocarbon contaminants therein; (b) drilling at least one extraction well into the underground zone and into the pool of liquid hydrocarbon contaminants therein; (c) introducing hot purge gas into the underground zone and the pool of liquid hydrocarbon contaminants therein by way of the injection well whereby light liquid hydrocarbons in and around the pool of liquid hydrocarbon contaminants are evaporated and dense liquid hydrocarbons in the pool are evaporated to some extent, charred, auto-ignited and combusted; and (d) pulling a vacuum on the underground zone by way of the extraction well whereby air is pulled through the porous ground formation above the underground zone therein which sweeps through the porous ground formation and through and around the underground zone therein and gases introduced and produced in the underground zone comprised of air, the vaporized light hydrocarbons, the hot purge gas and combustion gases from the combustion of the dense hydrocarbons are removed from the underground zone.

Yet another method of the present invention for extracting a pool of liquid hydrocarbon contaminants from an underground zone below a water table is comprised of the following steps: (a) drilling an injection well into the underground zone and into the pool of liquid hydrocarbon contaminants therein; (b) drilling at least one extraction well into the underground zone and the pool of liquid hydrocarbon contaminants therein; (c) introducing a hot purge gas into the underground zone and the pool of liquid hydrocarbon contaminants therein by way of the injection well whereby light liquid hydrocarbons in the pool of liquid hydrocarbon contaminants are evaporated and dense liquid hydrocarbons in the pool are evaporated to some extent, charred, auto-ignited and combusted; and (d) pulling a vacuum on the underground zone by way of the extraction well whereby gases introduced and produced in the underground zone comprised of the vaporized light liquid hydrocarbons, water, the hot purge gas and combustion gases from the combustion of the dense hydrocarbons are removed from the underground zone.

Thus, the present invention is well adapted to carry out the objects and attain the ends and advantages mentioned as well as those which are inherent therein. While numerous changes may be made by those skilled in the art, such changes are encompassed within the spirit of this invention as defined by the appended claims.

What is claimed is:

1. A method of extracting a pool of liquid hydrocarbon contaminants from an underground zone in a porous ground formation at the bottom of the formation or adjacent to and above a water table therein comprising the steps of:

(a) drilling an injection well into said underground zone and into said pool of liquid hydrocarbon contaminants therein;

(b) drilling at least one extraction well into said underground zone and said pool of liquid hydrocarbon contaminants therein;

(c) introducing a hot purge gas into said underground zone and said pool of liquid hydrocarbon contaminants therein by way of said injection well whereby light liquid hydrocarbons in and around said pool of liquid hydrocarbon contaminants are evaporated and dense liquid hydrocarbons in said pool are evaporated to some extent, charred, auto-ignited and combusted; and (d) pulling a vacuum on said underground zone by way of said extraction well whereby air is pulled through said porous ground formation above said underground zone therein which sweeps through said porous ground formation and through and around said underground zone therein and gases introduced and produced in said underground zone comprised of said air, said evaporated light liquid hydrocarbons, said hot purge gas and combustion gases from the combustion of said dense liquid hydrocarbons are removed from said underground zone.

2. The method of claim 1 wherein said hot purge gas is comprised of combustion gases formed by the combustion of air and fuel.

3. The method of claim 2 wherein said fuel is comprised of one or more light hydrocarbons.

4. The method of claim 1 wherein said hot purge gas is introduced into said underground zone in accordance with step (a) at a temperature in the range of from about 350° F. to about 1000° F.

5. The method of claim 1 wherein said light liquid hydrocarbons are comprised of gasoline, kerosene, diesel oil or jet fuel.

6. The method of claim 1 wherein said dense liquid hydrocarbons are comprised of hydrocarbons which do not vaporize at temperatures below about 650° F.

7. The method of claim 1 wherein said dense hydrocarbons are comprised of heavy oil or creosote oil.

8. A method of extracting a pool of liquid hydrocarbon contaminants from an underground zone below a water table comprising the steps of:

(a) drilling an injection well into said underground zone and into said pool of liquid hydrocarbon contaminants therein;

(b) drilling at least one extraction well into said underground zone and said pool of liquid hydrocarbon contaminants therein;

(c) introducing a hot purge gas into said underground zone and said pool of liquid hydrocarbon contaminants therein by way of said injection well whereby light liquid hydrocarbons in said pool of liquid hydrocarbon contaminants are evaporated and dense liquid hydrocarbons in said pool are evaporated to some extent, charred, auto-ignited and combusted; and;

(d) pulling a vacuum on said underground zone by way of said extraction well whereby gases introduced and produced in said underground zone comprised of said vaporized light liquid hydrocarbons, said purge gas and combustion gases from the combustion of said dense liquid hydrocarbons are removed from said underground zone.

9. The method of claim 8 wherein said hot purge gas is comprised of combustion gases formed by the combustion of air and fuel.

10. The method of claim 9 wherein said fuel is comprised of one or more light hydrocarbons.

11. The method of claim 8 wherein said combustion gas includes a controlled amount of air.

12. The method of claim 8 wherein said hot purge gas is introduced into said underground zone in accordance with step (a) at a temperature in the range of from about 350° F. to about 1000° F.

13. The method of claim 8 wherein said dense liquid hydrocarbons are comprised of hydrocarbons which do not vaporize at temperatures below about 650° F.

14. The method of claim 8 wherein said dense liquid hydrocarbons are comprised of heavy oil or creosote oil.

* * * * *